(12) United States Patent
Loui et al.

(10) Patent No.: US 7,380,514 B2
(45) Date of Patent: Jun. 3, 2008

(54) HULL WITH IMPROVED TRIM CONTROL

(75) Inventors: Steven Loui, Honolulu, HI (US); Scott Yamashita, Honolulu, HI (US); Gary Shimozono, Kapolei, HI (US)

(73) Assignee: Navatek, Ltd., Honolulu, HI (US)

( * ) Notice: Subject to any disclaimer, the term of this patent is extended or adjusted under 35 U.S.C. 154(b) by 0 days.

(21) Appl. No.: 11/511,253

(22) Filed: Aug. 29, 2006

(65) Prior Publication Data

US 2007/0101920 A1    May 10, 2007

Related U.S. Application Data

(63) Continuation-in-part of application No. 11/294,416, filed on Dec. 6, 2005, now Pat. No. 7,299,763, and a continuation-in-part of application No. 11/315,304, filed on Dec. 23, 2005, now Pat. No. 7,311,059.

(60) Provisional application No. 60/639,856, filed on Dec. 27, 2004, provisional application No. 60/637,736, filed on Dec. 22, 2004.

(51) Int. Cl.
*B63B 1/22* (2006.01)
(52) U.S. Cl. .................................. 114/285; 114/288
(58) Field of Classification Search ................ 114/285, 114/288, 289
See application file for complete search history.

(56) References Cited

U.S. PATENT DOCUMENTS

| | | | | |
|---|---|---|---|---|
| 2,172,674 A | * | 9/1939 | Frost | 114/288 |
| 3,327,671 A | * | 6/1967 | Comins | 114/285 |
| 4,977,845 A | * | 12/1990 | Rundquist | 114/289 |
| 6,684,807 B1 | * | 2/2004 | Smith | 114/285 |
| 2002/0174818 A1 | * | 11/2002 | von Wolske | 114/286 |

* cited by examiner

*Primary Examiner*—Stephen Avila
(74) *Attorney, Agent, or Firm*—Fitzpatrick, Cella, Harper & Scinto (57) ABSTRACT

A boat hull has at least one rocker chute formed therein open to the water forward of the hull's transom. The chute has a leading edge forward of the transom and an interceptor plate projects downwardly from the hull at said leading edge.

68 Claims, 7 Drawing Sheets

HULL WITH IMPROVED TRIM CONTROL

SUMMARY OF THE INVENTION

This application is a continuation-in-part of U.S. patent application Ser. Nos. 11/294,416, filed Dec. 6, 2005 and Ser. No. 11/315,304, filed Dec. 23, 2005, now U.S. Pat. Nos. 7,299,763 and 7,311,059, respectively, which are based on Provisional Application Nos. 60/637,736 filed Dec. 22, 2004 and 60/639,856 filed Dec. 27, 2004, respectively.

The present invention relates to boat hulls and more in particular to boat hulls having flow interceptors for improved trim control.

BACKGROUND OF THE INVENTION

Field of the Invention

Watercraft speed efficiency is achieved by reducing watercraft drag and improving the efficiency of the propulsion system. The result is higher speeds for the same amount of power used or less power needed to achieve the same speed.

Two prior art technologies previously developed to accomplish these goals are surface propellers operating in ventilating propulsion tunnels formed in the watercraft hull and flow interceptors attached to the transom of a watercraft. Flow interceptors project downwardly from the transom below the hull surface either vertically or at an angle. One such system is shown in U.S. Pat. No. 6,006,689.

Transom mounted flow interceptors have been found to reduce hull drag by providing lift which reduces hull immersion in the water. Reducing hull drag improves watercraft seakeeping and propulsive efficiency by providing trim control forces to achieve the optimal watercraft trim (which varies with speed), watercraft weight and sea conditions. Such systems are usually mounted directly at the transom, which creates large trimming moments that can push the bow down and create an adverse trim condition.

In the parent applications identified above it was disclosed that by using a flow interceptor in a novel position on a hull at the leading edge of a hull's ventilating propulsion tunnel or entrapment tunnel improved control of water flow and propulsive efficiency were achieved.

It is an object of the present invention to provide increased efficiency of a vessel, with or without ventilating propulsion tunnels, under different loading conditions and in different sea conditions.

It is a further object of the present invention to provide such increased efficiency through the effective control of vessel trim and through the development of lift in the vicinity of the longitudinal center of gravity of the vessel.

It is a further object of the present invention to control vessel trim with the use of a convex hull bottom surface or plate in the after portion of the underwater body of the vessel.

It is a further object of the present invention to control vessel trim and create dynamic lift in the after portion of the underwater body of the vessel in operation.

It is an object of the present invention to increase dynamic lift in hulls.

BRIEF DESCRIPTION OF THE INVENTION

In accordance with an aspect of the present invention the trim of a watercraft hull or vessel is efficiently and effectively managed by controlling the opposing vertical forces on the stern of the vessel developed by the shape of the after underwater body of the vessel, by the use of flow interceptors. More specifically the invention advantageously utilizes the underwater shape of a ship's hull in conjunction with interceptor plates positioned either forward of or at the hull's transom to achieve this control.

It is known that the Bernoulli force normal to a convex surface created by fluid flow over the surface has been thoroughly described with regard to the lift developed by air or water flow over a foil, or wing shape. In the most common application, the force normal to the foil shape applies to aircraft wings, and is vertically upward. In the application of the present invention the convex shape of an underwater body at the stern of a vessel, which normally causes the fluid flow over the surface to create a downward force, is used to achieve the desired effective control of vessel trim. The downward force at the stern of such vessel (also called Bernoulli sinkage) causes the bow to rise relative to the stern and the water surface.

Understanding that fluid flowing over a convex curved or foil shaped surface causes a force normal to and away from the surface to be created, it can be shown that by constructing such a surface into the after underwater body of a vessel a relatively negative pressure can be developed under the vessel in the region of this curvature. In naval architecture terminology such convex curvature is referred to as rocker. The negative hydrostatic pressure under the stern of the vessel in the region of the rocker causes the stern to sink, or squat. This increased immersion of the stern causes the bow to rise relative to the stern and for the vessel to then be trimmed up by the bow.

Interceptors are flat plates subtending vertically downward from the hull of a vessel, at the transom, such that when the vessel is in operation and water is flowing along the surface of the vessel the interceptors cause a flow stagnation pressure lift to be created on the upstream side of the plate, or just forward of the interceptors.

This higher pressure area causes a vertical force to be developed onto the surface in the region of the vertical plate in the flow stream. In naval architecture and hydrodynamics such vertical plates installed for the purpose of generating said vertical force are referred to as interceptors. Interceptors affixed to the underwater body of a vessel when the vessel is underway and having water flow along the underwater body will generate the higher pressure area causing a lifting force on the vessel, and if the interceptors are aft then the force will cause the stern to be raised relative to the bow. The vessel is then said to be trimmed down by the bow.

As compared to a transom mounted interceptor, an interceptor plate mounted in a hull forward of the transom provides greater lift and reduction of hull immersion and also provides improved trim control forces.

Interceptors are very effective at controlling the degree of lift developed at the stem of a vessel, and can be designed to readily match or exceed the depression of the stem as a result of Bernoulli sinkage, and, thus, provide an additional degree of control for trim of the vessel.

The ability of a vessel to operate with a minimum of objectionable motions in a given sea state, that is the sea-kindliness of the vessel, and the ability to steer easily on a given heading, that is the sea-keeping of the vessel, are, among other things, dependent upon the trim of the vessel. Trim may change as a result of moving weights about the vessel. A change in the trim may be required in order to maintain sea-kindliness or sea-keeping when sea conditions change or when the vessel's heading relative to the sea is changed.

A vessel will operate more efficiently when it is so operated as to be able to maintain ordered course and speed with minimal disruption.

The prior art has failed to recognize the significant increase in vessel efficiency that can be developed by carefully designed use of a hull having a rocker shape in its aft portion and the use of interceptors forward of the rocker shape to allow precise trim management. Also, the prior art has failed to recognize the advantages of positioning interceptors forward of the transom in conjunction with rocker.

The positioning of the interceptor(s) from the transom to a point further forward and closer to the longitudinal center of gravity also will cause the lifting force to be exerted on the hull in general and to reduce the extent of wetted surface, and, in turn, to reduce drag on the hull. Alternatively, the lift induced by the interceptors may compensate for added displacement resulting from loading the vessel.

Moreover, with an interceptor placed closer to the longitudinal center of gravity (LCG) of the hull, the lift generated will create a lower trimming moment than the same amount of lift generated by a transom mounted interceptor, which is further from the LCG. Trimming moments will eventually push the bow down to an excessive and adverse bow down trim condition and the onset of this condition will be reached later with the greater lifting force and lesser trimming moment provided by the forwardly positioned interceptor.

BRIEF DESCRIPTION OF THE DRAWINGS

The above and other objects, features and advantages of the present invention will become apparent from the following detailed description of illustrative embodiments thereof, which is to be read in conjunction with the accompanying drawings, wherein.

DETAILED DESCRIPTION OF THE PREFERRED EMBODIMENTS

Figure 1:
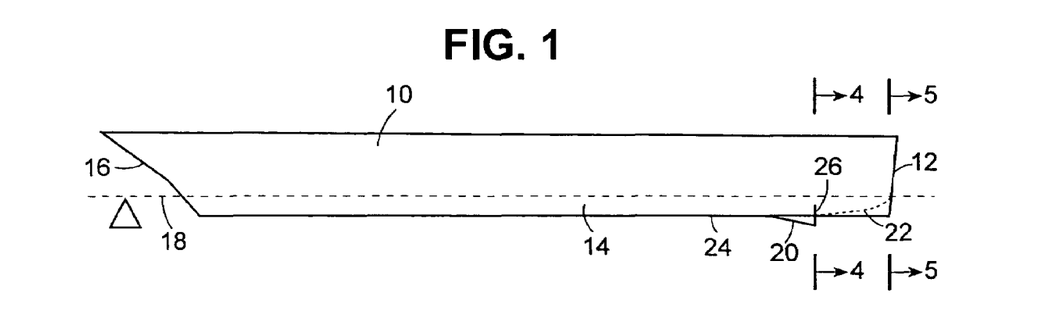
FIG. 1 is a side elevational view of a boat hull in accordance with the present invention.

Referring now to the drawings in detail, and initially to FIG. 1, a boat hull 10 is illustrated which includes a rear transom 12, a hull bottom 14 and a bow 16. The hull is shown at rest at an even keel, i.e. without trim, and has a design water line 18. The hull bottom 14 has a central aft portion or rocker 22 extending arcuately from the keel 24 to the transom 12 in a generally convex curve. The curvature is shown greatly exaggerated in the drawings for clarity.

In accordance with the present invention, immediately forward of the rocker 22 an interceptor plate 26 is provided which may be extended to depend downwardly from the surface of the bottom 14 of the hull 10. Immediately forward of interceptor plate 26 are a pair of spaced generally triangular side plates 28 which are either fixed to the hull or integrally formed with the interceptor plate 26.

Figure 2:
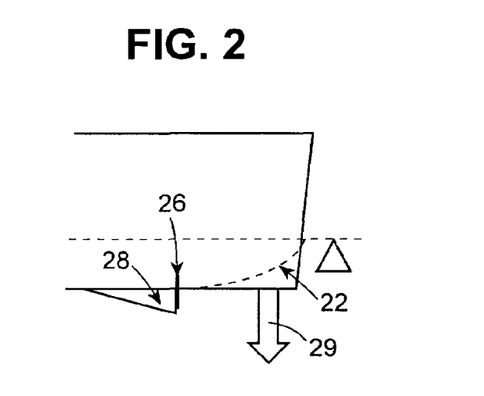
FIG. 2 is an enlarged side view of the aft section of the hull of FIG. 1.
Figure 3:
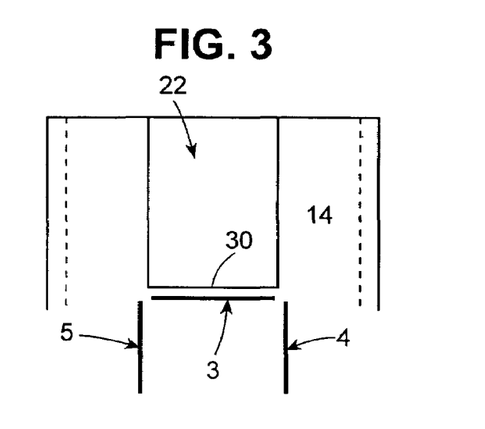
FIG. 3 is a bottom view of the hull section shown in FIG. 2.

The construction of the interceptor plate is more clearly illustrated in FIGS. 2 and 3. In this embodiment the hull 10 has a single rocker 22 formed in bottom 14. As will be appreciated the rocker is recessed in the hull and may be referred to as a rocker chute or pocket. It may be formed of materials that are the same as, or compatible with the material of which the hull is formed.

The dimension and convexity of the rocker is dimensioned and shaped based on the size of hull, ship's weight and Bernoulli principals, as would be understood by those skilled in the art, in order to develop the desired degree of trim in the vessel as described above and indicated by arrow 29 in FIG. 2.

Figure 4:
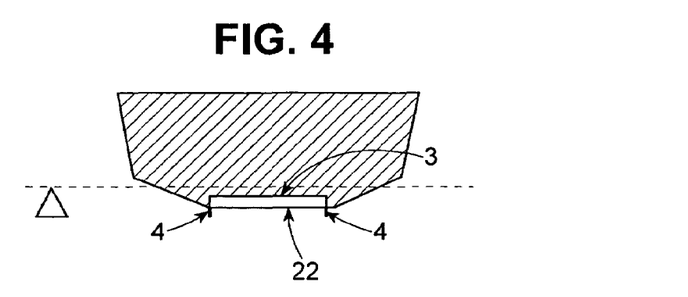
FIG. 4 is a sectional view taken along line 4-4 of FIG. 1.
Figure 5:
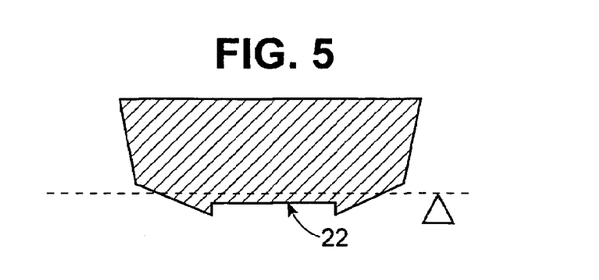
FIG. 5 is a sectional view along line 5-5 of FIG. 1.

In accordance with the present invention, the leading edge 30 of the rocker is immediately preceded in the forward direction by the interceptor plate 26 and the side plates 28 one of which is seen in the side view of FIG. 2) are located such that the downwardly depending interceptor plate 26 may be extended below the hull or keel 24, a pre-determined distance, depending in part on the size of the vessel, with the side plates 26 tapering in a triangular shape from their rear edges whose height is between one and four inches towards the forward end of the hull where their height is zero. The leading edge of the interceptor may also be referred to as a spoiler or a vertical trim tab. It is either fixed in place or movably mounted on the hull. It may be positioned to align with the aft ends of the side plates as shown or positioned between the aft ends of those plates. FIG. 4 shows the interceptor plate partly extended between side plates.

Figure 6:
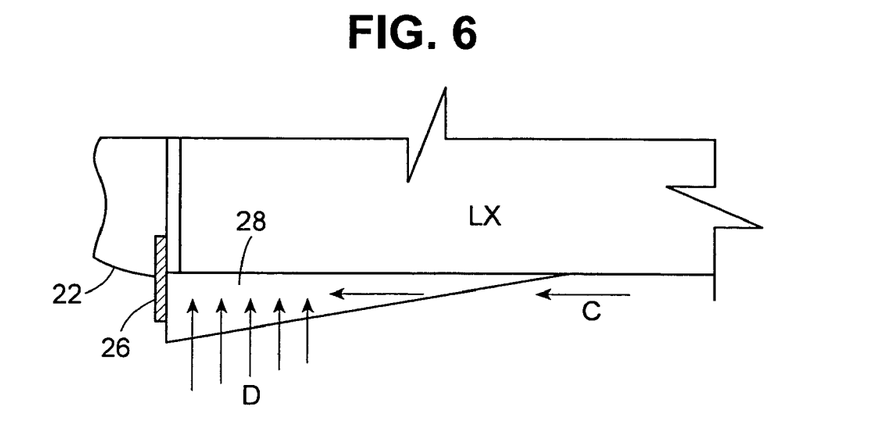
FIG. 6 is a schematic sectional view of a portion of the hull of FIG. 2, taken through the interceptor plate forward of the rocker.

Preferably, as described hereinafter, the position of at least the vertical interceptor plate 26 is adjustable so that the amount of penetration of the interceptor plate into the water beneath the hull may be varied. The provision of an adjustable interceptor plate in accordance with the invention creates a lift augmentation appendage by creating a high stagnation pressure on the hull immediately forward of the plate to counteract the downward trim forces produced by the rocker, as indicated by the arrows C and D in FIG. 6. The practical range of adjustment is small, for example, perhaps up to 3 inches. The arrows C show the direction of flow of water during forward motion of the vessel along the bottom 14 of the vessel. This flow is intercepted at the leading edge of the rocker 22 by the interceptor plate 26 and is contained within the side plates 28. This produces the upward lifting force indicated by the arrows D. This additional lift thus produced also reduces drag by reducing the total area of hull immersed in the water.

The function of the side plates 28 on the hull is to contain the stagnation pressure and to mitigate tip vortices in the rocker chute and also to prevent separated flow off the trailing edge of the interceptor.

In addition, because the rocker or rocker chute is forward of the transom 12, the interceptor plate is closer to the longitudinal center of gravity of the hull (the LCG) than the normal position for such plates, i.e. at the transom. Thus, the lift generated at the hull immediately forward of the interceptor has a lower pitching moment than if the lift is generated at the transom, as occurred with conventional interceptors. This creates the further benefit of allowing greater lift to be generated without adversely effecting vessel trim.

Figure 7:
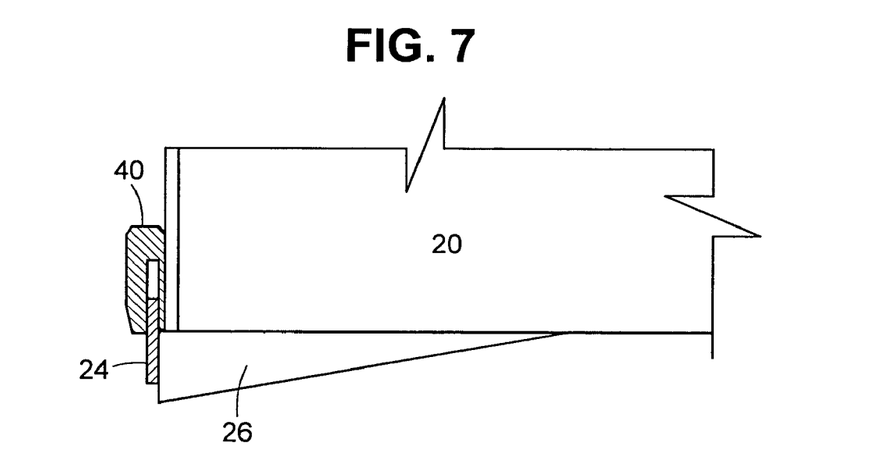
FIG. 7 is a view similar to FIG. 6 showing an electro magnetic device for controlling actuation of the interceptor.

FIG. 7 illustrates an electrically operated linear actuator 40 for the interceptor plate 26 as an alternative to a fixed plate. The electromechanical actuator can be of any known construction to allow the plate 26 to retract into the hull or extend from the hull at any desired amount within the range of its motion. For example, the plate could be connected to solenoids or magnets which control its position. As mentioned above, the plate can be formed separate from the side plates 28, or can be molded integrally therewith. In that case, the side plates would be received in slots in the hull (not shown) and retracted and extended with the interceptor plate 22.

Figure 8:
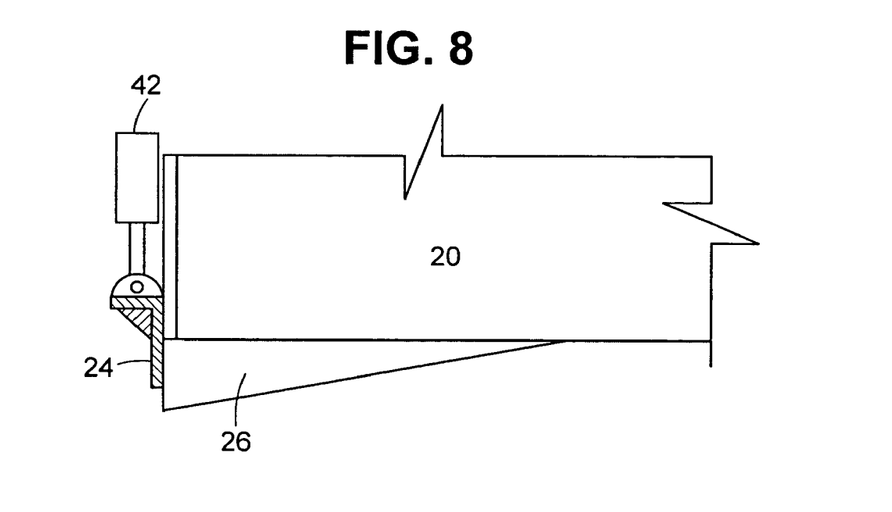
FIG. 8 is a view similar to FIG. 6 showing a hydraulic mechanism for controlling actuation of the interceptor.

FIG. 8 discloses another embodiment of the invention wherein a hydraulic ram, also of conventional construction, is connected to the interceptor plate 22 to raise it into the hull 14 or extend it beyond the hull. Here again, the plate 22 may be integrally formed with the side plates 28 so that they can be extended and retracted from the hull as well.

Figure 9:
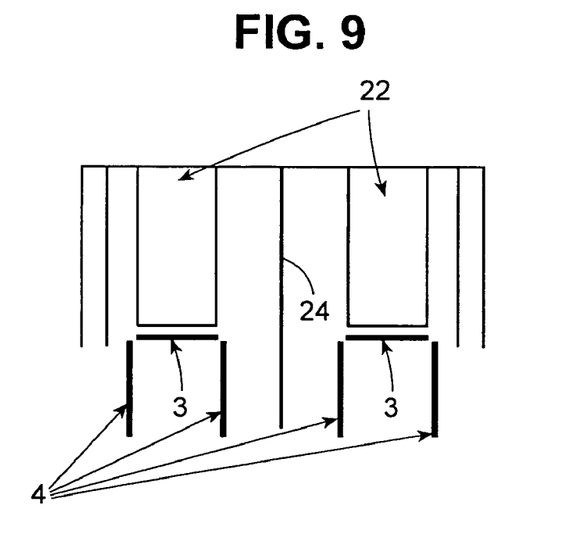
FIG. 9 is a bottom view similar to FIG. 3 of another embodiment of the invention using two rockers and two interceptors.

Another embodiment of the invention is illustrated in FIG. 9 in which two rockers or rocker chutes 22 are provided, on either side of the keel 24 of the hull. Each of the rockers is provided with an interceptor plate 22 and side plates 28. As discussed above, the plates 22, 28 fixed on the hull, independently adjustable, or the interceptor plates may be adjustable and the side plates fixed. In the embodiment shown in FIGS. 9 and 10 plates 22 are straight to conform with the hull. Other shapes may be used as well.

In the present embodiment and alternative embodiments of the invention the interceptor plates 3 are extended and, as noted above, the extension and retraction of the interceptor plates can be done automatically using rams or solenoids, or they can be operated manually in any convenient manner. In addition each can be operated independently of the other. If the degree of extension is different between the two interceptors then the interceptor that is more fully extended will provide greater lift on the hull, and the lift on that side may be used to compensate for unequal loading athwartship or to assist in steering the vessel. The interceptors may be moved by small increments to precisely control the lift on the hull.

Figure 10:
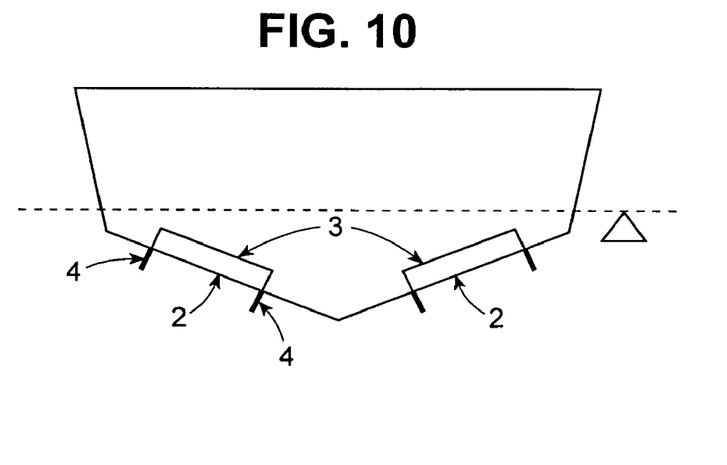
FIG. 10 is a sectional view similar to FIG. 4 of the embodiment of FIG. 9.
Figure 11:
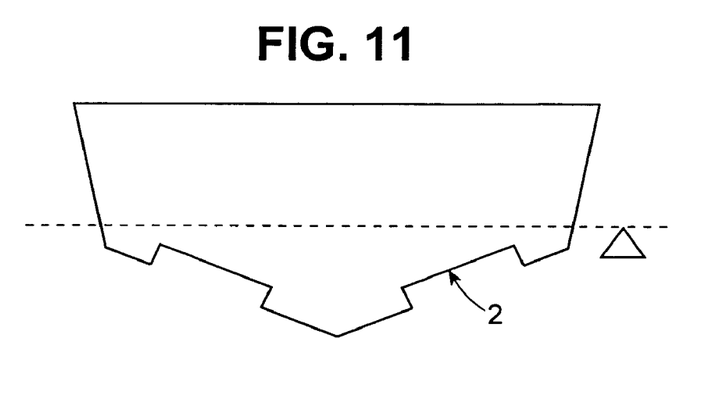
FIG. 11 is a sectional view similar to FIG. 5 of the embodiment of FIG. 9.
Figure 12:
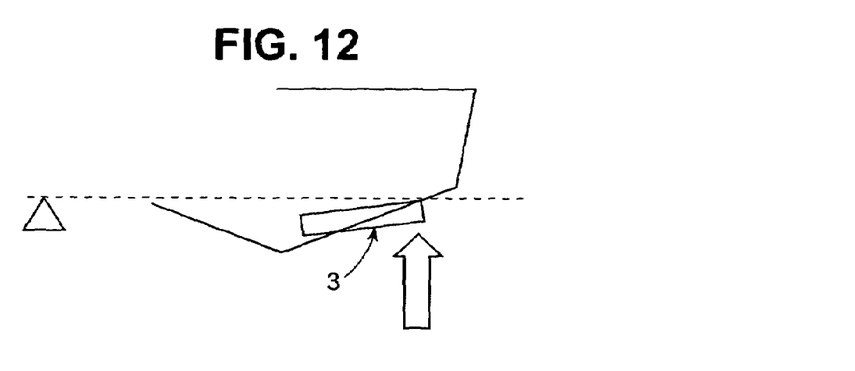
FIG. 12 is a sectional view similar to FIG. 10 of yet another embodiment of the invention.
Figure 13:
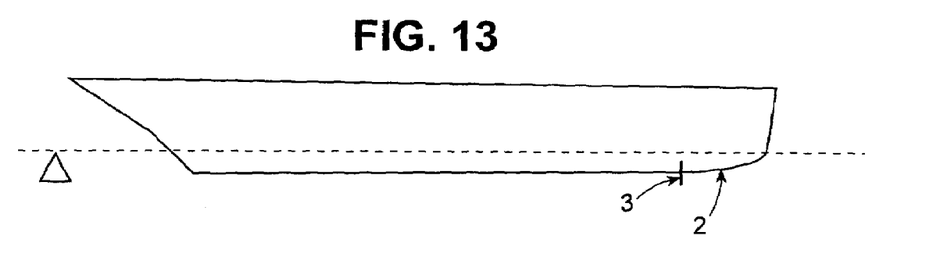
FIG. 13 is a schematic side view of the hull of FIG. 1 with the interceptor extended and the vessel at rest.

FIG. 10 shows a partial stern view of a vessel 10 at the stern and illustrates that in another embodiment of the invention the interceptors may be controlled so as to extend the inboard or outboard ends of the interceptor plate differently to further control the degree of lift on the hull. This can be done by pivoting the interceptors at one end, or by having them connected at each end to separately controllable hydraulic rams so that the ends can be extended to different degrees thereby tilting the plate. As presented in this illustration the extension of the interceptor 3 suggests an upward force primarily at the outboard end of the plate.

In another embodiment of the invention, each of the interceptor plates 22 may be segmented and connected to separate controls so that the amount of liquid intercepted and the pattern of flow and the trim adjustment caused by the interceptors may be varied.

It is noted that in the illustrative embodiment of the invention the interceptors 22 are shown as extending only along the width of the rocker chute. However, it is contemplated that these plates may be wider than the rocker chutes themselves and extend, for example, from a position near the keel 14 to the chine on the sides of the vessel, across the front of the chute.

Applicant has conducted computer based studies with respect to boat hulls having rocker chutes and interceptor plates according to the present invention in order to confirm their effectiveness.

Figure 14:
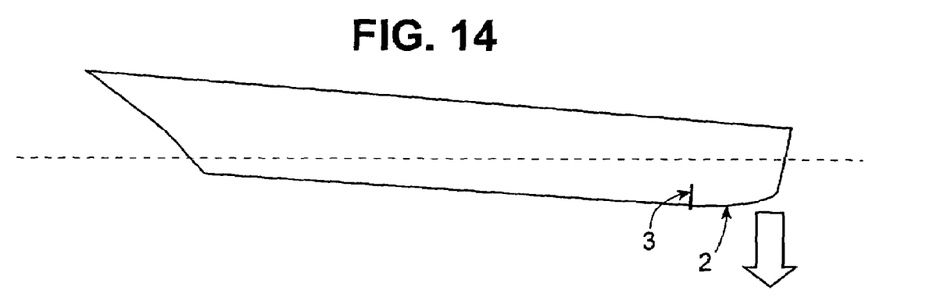
FIG. 14 is a view similar to FIG. 14 with the interceptor at rest and the hull operated at a design speed.
Figure 15:
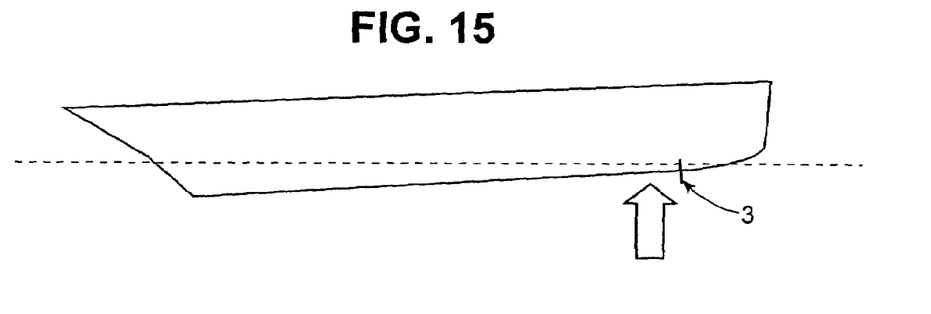
FIG. 15 is a view similar to FIG. 14 but with the interceptor extended.
Figure 16:
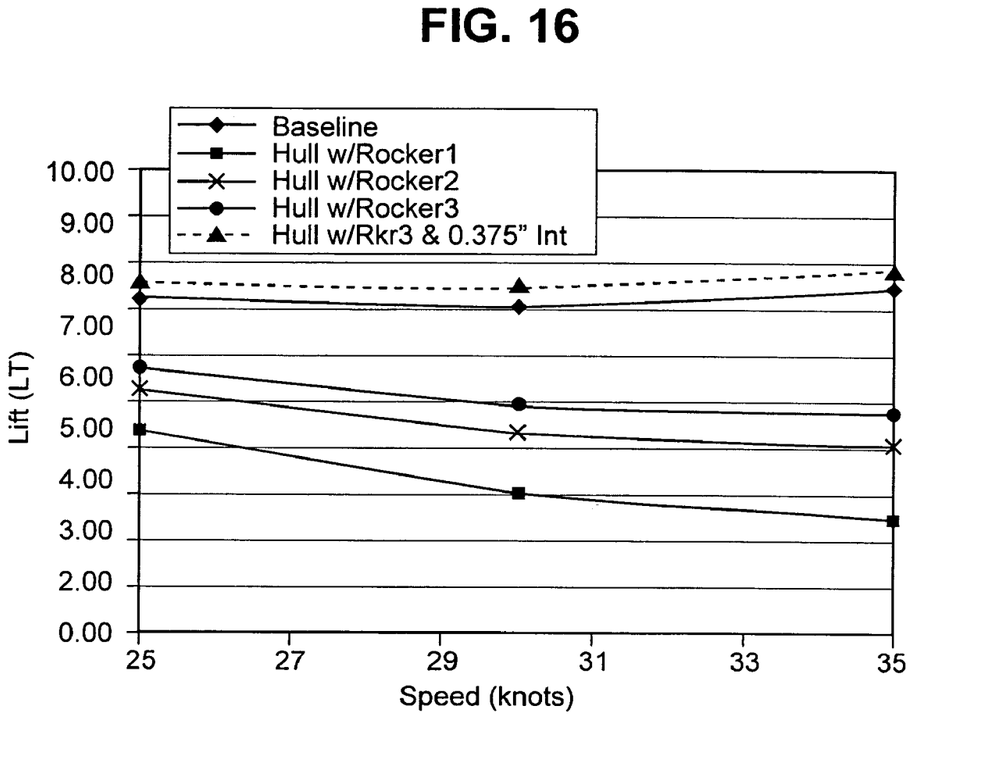
FIG. 16 is a graph showing experimental data showing the lift effect of the present invention relative to a bare hull.

The computer studies tested a baseline hull form with no rocker using known CFX software over a speed range of 25-35 knots. The resulting baseline lift is shown in the graph of FIG. 14. Three other tests were conducted with hulls using rockers of increasing curvature and with the vessel operating at varying speeds. The graph illustrates that the installing of rocker into the after underwater body of the test boat causes a decrease in the lift relative to the baseline. This is caused by the relative decrease in hydrostatic pressure resulting from the fluid flow over the convex surface. This decrease in lift at the stern will cause the stern to sink and the bow to lift to a trim up position as shown on FIG. 14.

As can also be seen in the chart, substantially greater lift is created on the vessel by the presence of only a 0.375 inch extending interceptor plate on a test hull with a rocker as compared to the same vessel with no rocker or interceptor plate. Even greater lifts, particularly at higher speeds, are achieved with interceptor plates that extend 1".

Figure 17:
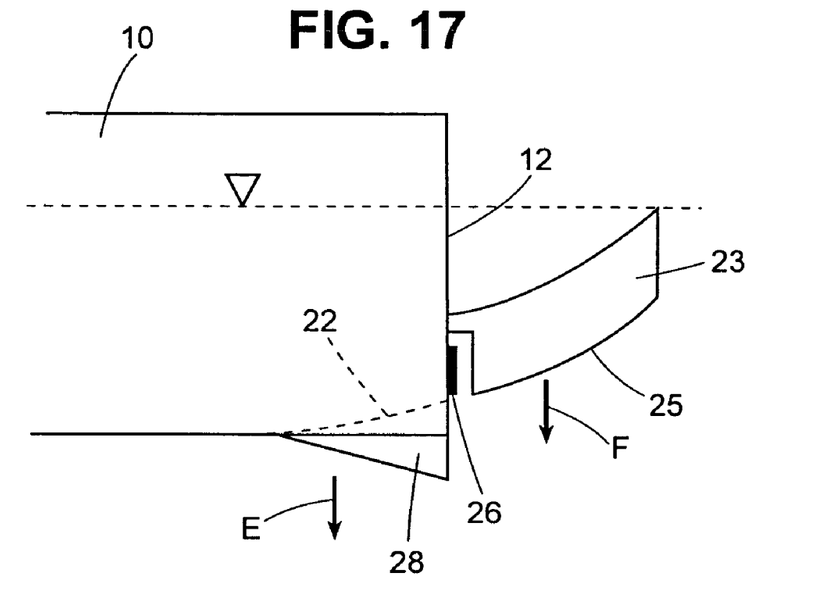
FIG. 17 is a side view similar to FIG. 2 of another embodiment of the present invention, with the interceptor retracted.

FIG. 17 is a side view similar to FIG. 2 of a preferred embodiment of the invention showing the aft end of a boat hull 10 having a transom 12 and a rocker section 22 formed in the hull bottom along the hull centerline. In this embodiment the interceptor plate 26 is mounted on the transom 12 in any convenient manner as described above. In addition the hull includes a rocker extension 23 mounted on or extending aft from the transom. This rocker extension has a bottom surface 25 curved to conform to the curvature of rocker 22 and having a width substantially equal to that of rocker 22. Rocker extension 23 is either formed integrally with hull 10 or separately formed and mounted on transom 12 in any convenient manner.

Figure 18:
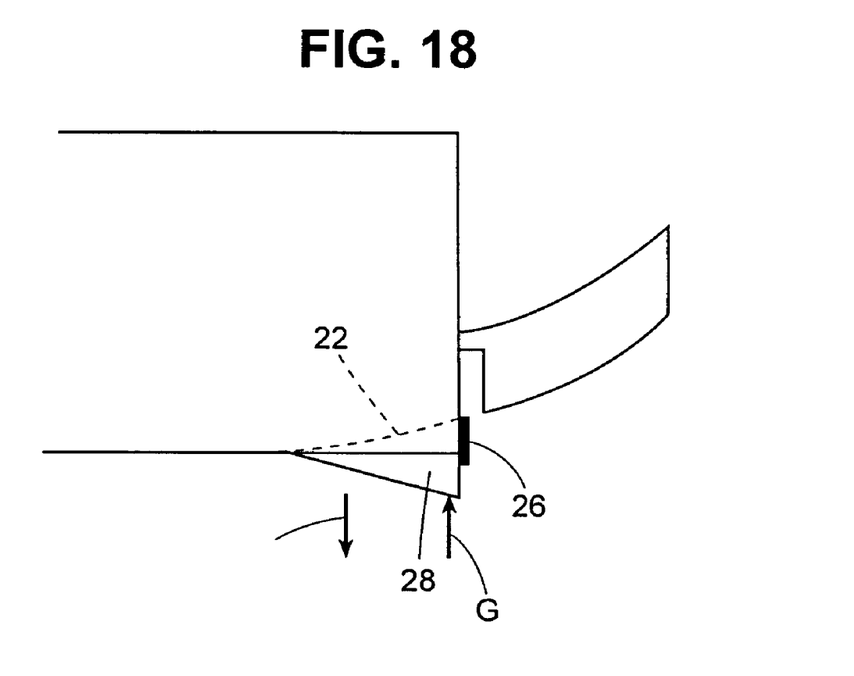
FIG. 18 is a side view of the embodiment of FIG. 17 with the interceptor extended.

FIG. 17 illustrates the interceptor 26 in its retracted position. As a result when the vessel is underway, downward trim forces are applied to the vessel at the rocker surfaces as described above and indicated by the arrows E and F. In the extended position of the interceptor, as shown in FIG. 18 lift forces shown by arrow G are created forward of the interceptor as described above to counteract the trim forces created by the rocker surfaces in front of it, while downward trim forces on the rocker extension are eliminated. Thus improve trim control can be achieved by adjustment of interceptor extension.

Figure 19:
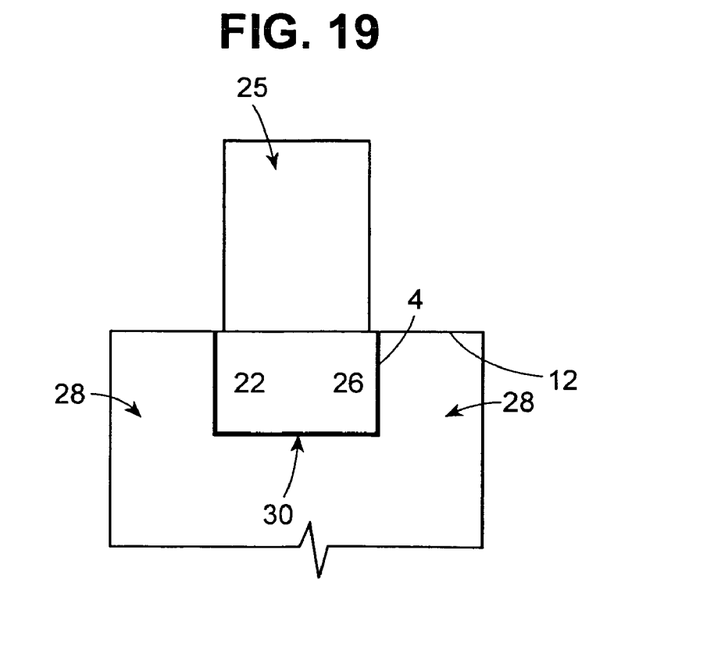
FIG. 19 is a bottom view of the embodiment shown in FIG. 17.

As with the previously described embodiments spaced triangular depending plates 28 are fixed to the hull or integrally formed with the interceptor plate immediately forward of the interceptor plate. In this embodiment they are located on sides of the rocker 26, as shown in FIG. 19.

The structure of this embodiment is simpler to implement than the previously described embodiments.

Figure 20:
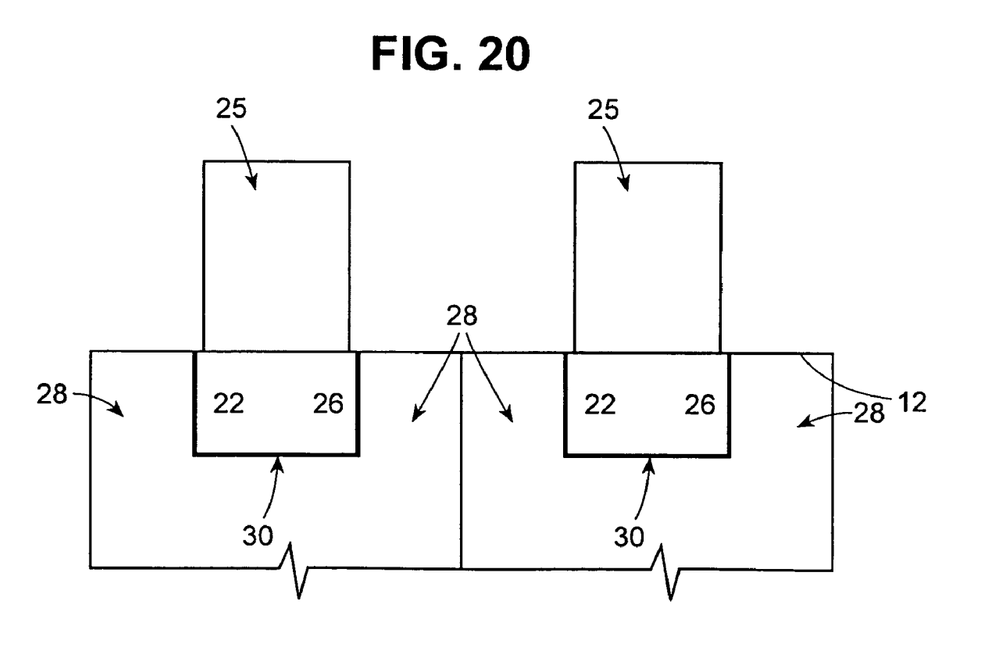
FIG. 20 is a bottom view similar to FIG. 9 of another embodiment using two rockers and rocker extensions with an interceptor as shown in FIGS. 17 and 18.

FIG. 20 shows the aft bottom portion of the hull having dual rockers located on opposite sides of the hull similar to what is known in FIG. 9. The rockers, rocker extensions, transom, and interceptor are identified with the same reference numerals as shown in FIGS. 17-19.

Although illustrative embodiments of the present invention have been described herein with reference to the accompanying drawings, it is to be understood that the invention is not limited to these precise embodiments and that various changes and modifications may be effected therein without departing from the scope or spirit of this invention.

What is claimed is:

1. A boat or ship hull having a keel, a transom, and at least one rocker portion formed in the aft portion of the hull facing the water; said rocker extending from a leading edge forward of the hull's transom adjacent the keel and curving upwardly to the transom; and interceptor plate means for linear reciprocal movement relative to the adjacent surface of the hull forward of said leading edge of the rocker whereby the interceptor plate means may be selectively extended and retracted relative to the hull.

2. A hull as defined in claim 1, including side plates projecting from said hull located at the rocker leading edge corners and running forward therefrom.

3. A hull as defined in claim 2 wherein said side plates project from said hull approximately 1 to 4 inches at the rocker leading edge and taper forwardly to a height of approximately zero.

4. A hull as defined in claim 1 wherein said hull includes means therein for varying the projection of the interceptor plate means from the hull.

5. A watercraft vessel comprising a hull having a transom and at least one rocker chute formed therein opening downwardly to the water surface when the hull is on the water, said chute having a leading edge located rearwardly of the LCG of the vessel and a rocker surface portion which extends from said leading edge in a curve upwardly to said transom; and an interceptor plate means mounted on said hull at the leading edge of the chute for reciprocal movement relative to the hull from a generally retracted position to an extended position to project a predetermined distance downwardly from the hull.

6. A watercraft as defined in claim 5 wherein said interceptor plate is movably mounted in the hull for movement between a first retracted position and a second filly extended position.

7. A watercraft as defined in claim 6 wherein said hull contains two rocker chutes and two movably mounted interceptor plates respectively located adjacent the leading edges of said chutes.

8. A watercraft as defined in claim 7 wherein said interceptor plates extend from adjacent the keel of the ship to positions adjacent the ships chine.

9. A watercraft as defined in claim 7 including means for moving said interceptor plates between said first and second positions and into any position therebetween.

10. A watercraft as defined in claim 5 including a pair of side plates extending from said hull from positions adjacent the leading edge corners of the chute forward a predetermined distance.

11. A watercraft as defined in claim 10 wherein said side plates are triangular with one leg adjacent the interceptor plate and tapering from that leg forwardly to a point.

12. A watercraft as defined in claim 11 wherein the legs of said plates adjacent the interceptor plate extend further from the hull than the maximum extension of the interceptor plates.

13. A watercraft as defined in claim 6 including a pair of side plates extending from said hull from positions adjacent the leading edge corners of the chute forward a predetermined distance.

14. A watercraft as defined in claim 12 wherein said side plates are triangular with one leg adjacent the interceptor plate and tapering from that leg forwardly to a point.

15. A watercraft as defined in claim 14 wherein the legs of said plates adjacent the interceptor plate extend further from the hull than the maximum extension of the interceptor plates.

16. A watercraft as defined in claim 10 wherein said side plates are integrally formed with said interceptor plate.

17. A watercraft as defined in claim 10 wherein said side plates are removably mounted in said hull for movement between a first retracted position and a second fully extended position independently of said interceptor plates.

18. A watercraft as defined in claim 17 including means for independently moving said interceptor plate and said side plates.

19. A ship hull as defined in claim 1 wherein said rocker is convex.

20. A watercraft hull as defined in claim 5 wherein said rocker is convex.

21. A boat or ship hull including a transom, said hull having at least one rocker formed in the aft portion of the hull facing the water; said rocker having a leading edge forward of the hull's transom and curving upwardly towards said transom; a rocker extension having a bottom surface conforming generally to an extension of the rocker surface facing the water at the transom and interceptor plate means for reciprocal movement relative to the adjacent surfaces of the hull from a position adjacent the transom of forward of said rocker extension bottom surface whereby the interceptor plate means may be selectively extended and retracted relative to the hull.

22. A hull as defined in claim 21, including side plates projecting from said hull located on opposite sides of the rocker and running aft to the transom adjacent the interceptor plate.

23. A hull as defined in claim 22 wherein said side plates project from said hull approximately 1 to 4 inches adjacent the interceptor plate and taper forwardly to a height of approximately zero.

24. A hull as defined in claim 21 wherein said hull includes means therein for varying the projection of the interceptor plate from the hull.

25. A watercraft vessel comprising a hull having a transom and at least one rocker chute formed therein opening downwardly to the water surface when the hull is on the water, said chute having a leading edge located rearwardly of the LCG of the vessel and a rocker surface portion which extends from said leading edge in a curve upwardly to the transom; an interceptor plate means mounted on said hull adjacent said transom for reciprocal movement relative to the hull from a generally retracted position to an extended position to project a predetermined distance downwardly from the hull; and a rocker extension having a bottom surface conforming generally to an extension of the rocker surface facing the water aft of the interceptor plate.

26. A watercraft as defined in claim 25 wherein said interceptor plate is movably mounted in the hull for movement between a first retracted position and a second fully extended position.

27. A watercraft as defined in claim 26 wherein said hull contains two rocker chutes, two movably mounted interceptor plates respectively located adjacent the transom and two rocker extensions mounted on the hull respectively associated with said rocker chutes.

28. A watercraft as defined in claim 27 including means for moving said interceptor plates between said first and second positions and into any position therebetween.

29. A watercraft as defined in claim 25 including a pair of side plates extending from said hull from positions adjacent opposite sides of the chute.

30. A watercraft as defined in claim 29 wherein said side plates are triangular with one leg adjacent the interceptor plate and tapering from that leg forwardly to a point.

31. A watercraft as defined in claim 30 wherein the legs of said plates adjacent the interceptor plate extend further from the hull than the maximum extension of the interceptor plates.

32. A watercraft as defined in claim 26 including a pair of side plates extending from said hull from positions adjacent the leading edge corners of the chute aft to a position adjacent the interceptor plates.

33. A watercraft as defined in claim 32 wherein said side plates are triangular with one leg adjacent the interceptor plate and tapering from that leg forwardly to a point.

34. A watercraft as defined in claim 33 wherein the legs of said plates adjacent the interceptor plate extend further from the hull than the maximum extension of the interceptor plates.

35. A watercraft as defined in claim 29 wherein said side plates are integrally formed with said interceptor plate.

36. A watercraft as defined in claim 29 wherein said side plates are removably mounted in said hull for movement between a first retracted position and a second fully extended position independently of said interceptor plates.

37. A watercraft as defined in claim 36 including means for independently moving said interceptor plate means and said side plates.

38. A ship hull as defined in claim 21 wherein said rocker is convex.

39. A watercraft hull as defined in claim 25 wherein said rocker is convex.

40. A boat or ship hull having at least one rocker formed in the aft portion of the hull facing the water; said rocker having a leading edge forward of the hull's transom; an interceptor plate projecting downwardly from the hull forward of said leading edge; and side plates projecting from said hull located at the rocker leading edge corners and running forward therefrom; said side plates projecting from said hull approximately 1 to 4 inches at the rocker leading edge and taper forwardly to a height of approximately zero.

41. A hull as defined in claim 40 wherein said interceptor plate is movably mounted in said hull and the hull includes means therein for varying the projection of the interceptor plate from the hull.

42. A watercraft vessel comprising a hull having at least one rocker chute formed therein opening downwardly to the water surface when the hull is on the water, said chute having a leading edge located rearwardly of the LCG of the vessel; an interceptor plate mounted on said hull at the leading edge of the chute to project a predetermined distance downwardly from the hull; said interceptor plate being movably mounted in the hull for movement between a first retracted position and a second fully extended position; and said hull containing two rocker chutes and two movably mounted interceptor plates respectively located adjacent the leading edges of said chutes.

43. A watercraft as defined in claim 42 wherein said interceptor plates extend from adjacent the keel of the ship to positions adjacent the ships chine.

44. A watercraft as defined in claim 42 including means for moving said interceptor plates between said first and second positions and into any position therebetween.

45. A watercraft as defined in claim 42 including a pair of side plates extending from said hull from positions adjacent the leading edge corners of the chute forward a predetermined distance.

46. A watercraft as defined in claim 42 including a pair of side plates extending from said hull from positions adjacent the leading edge corners of the chute forward a predetermined distance.

47. A watercraft as defined in claim 45 wherein said side plates are integrally formed with said interceptor plate.

48. A watercraft as defined in claim 45 wherein said side plates are removably mounted in said hull for movement between a first retracted position and a second fully extended position independently of said interceptor plates.

49. A watercraft as defined in claim 48 including means for independently moving said interceptor plate and said side plates.

50. A watercraft hull as defined in claim 49 wherein said rocker is convex.

51. A watercraft vessel comprising a hull having at least one rocker chute formed therein opening downwardly to the water surface when the hull is on the water, said chute having a leading edge located rearwardly of the LCG of the vessel; and an interceptor plate mounted on said hull at the leading edge of the chute to project a predetermined distance downwardly from the hull and a pair of side plates extending from said hull from positions adjacent the leading edge corners of the chute forward a predetermined distance; said side plates being triangular with one leg adjacent the interceptor plate and tapering from that leg forwardly to a point.

52. A watercraft as defined in claim 51 wherein the legs of said plates adjacent the interceptor plate extend further from the hull than the maximum extension of the interceptor plates.

53. A watercraft as defined in claim 52 wherein said side plates are triangular with one leg adjacent the interceptor plate and tapering from that leg forwardly to a point.

54. A watercraft as defined in claim 53 wherein the legs of said plates adjacent the interceptor plate extend further from the hull than the maximum extension of the interceptor plates.

55. A boat or ship hull having at least one rocker formed in the aft portion of the hull facing the water; said rocker having a leading edge forward of the hull's transom and an interceptor plate projecting downwardly from the hull forward of said leading edge; and wherein said rocker is convex.

56. A boat or ship hull including a transom, said hull having at least one rocker formed in the aft portion of the hull facing the water; said rocker having a leading edge forward of the hull's transom; a rocker extension having a bottom surface conforming generally to an extension of the rocker surface facing the water, an interceptor plate projecting downwardly from a position adjacent the transom of forward of said rocker extension bottom surface; and side plates projecting from said hull located on opposite sides of the rocker and running aft to the transom adjacent the interceptor plate; said side plates projecting from said hull approximately 1 to 4 inches adjacent the interceptor plate and taper forwardly to a height of approximately zero.

57. A hull as defined in claim 56 wherein said interceptor plate is movably mounted on said hull and the hull includes means therein for varying the projection of the interceptor plate from the hull.

58. A watercraft vessel comprising a hull having a transom and at least one rocker chute formed therein opening downwardly to the water surface when the hull is on the water, said chute having a leading edge located rearwardly of the LCG of the vessel; an interceptor plate mounted on said hull adjacent said transom to project a predetermined distance downwardly from the hull; and a rocker extension having a bottom surface conforming generally to an extension of the rocker surface facing the water aft of the interceptor plate; said interceptor plate being movably mounted in the hull for movement between a first retracted position and a second fully extended position; and said hull containing two rocker chutes, two movably mounted interceptor plates respectively located adjacent the transom and two rocker extensions mounted on the hull respectively associated with said rocker chutes.

59. A watercraft as defined in claim 58 including means for moving said interceptor plates between said first and second positions and into any position therebetween.

60. A watercraft as defined in claim 58 including a pair of side plates extending from said hull from positions adjacent opposite sides of the chute.

61. A watercraft as defined in claim 60 wherein said side plates are triangular with one leg adjacent the interceptor plate and tapering from that leg forwardly to a point.

62. A watercraft as defined in claim 61 wherein the legs of said plates adjacent the interceptor plate extend further from the hull than the maximum extension of the interceptor plates.

63. A watercraft as defined in claim 60 including a pair of side plates extending from said hull from positions adjacent the leading edge corners of the chute aft to a position adjacent the interceptor plates.

64. A watercraft as defined in claim 63 wherein said side plates are triangular with one leg adjacent the interceptor plate and tapering from that leg forwardly to a point.

65. A watercraft as defined in claim 64 wherein the legs of said plates adjacent the interceptor plate extend further from the hull than the maximum extension of the interceptor plates.

66. A watercraft as defined in claim 60 wherein said side plates are integrally formed with said interceptor plate.

67. A watercraft as defined in claim 60 wherein said side plates are removably mounted in said hull for movement between a first retracted position and a second fully extended position independently of said interceptor plates.

68. A watercraft as defined in claim 67 including means for independently moving said interceptor plate and said side plates.

* * * * *